Feb. 12, 1952   C. NICOLIN ET AL   2,585,576
GAS TURBINE UNIT FOR DRIVING ELECTRIC GENERATORS
Filed Oct. 24, 1949   2 SHEETS—SHEET 1
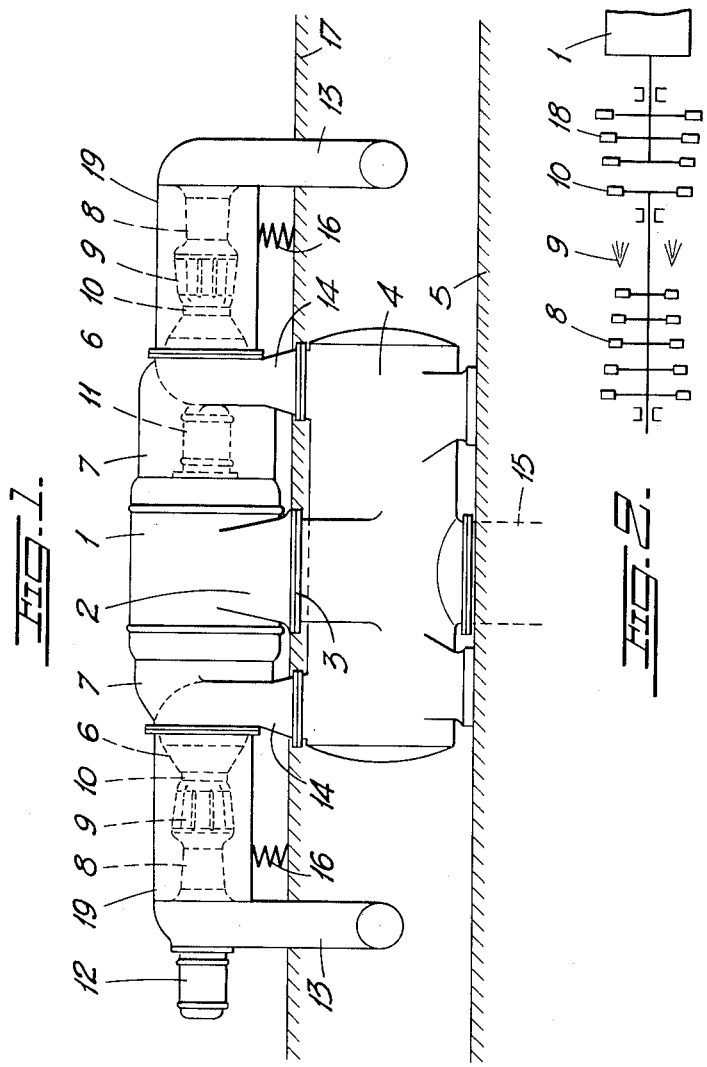
Inventor
Curt Nicolin
Oscar Anton Wiberg
Frans Eric Ossian Ostmar
by Sommers & Young
Attorneys Feb. 12, 1952          C. NICOLIN ET AL          2,585,576
GAS TURBINE UNIT FOR DRIVING ELECTRIC GENERATORS
Filed Oct. 24, 1949                        2 SHEETS—SHEET 2
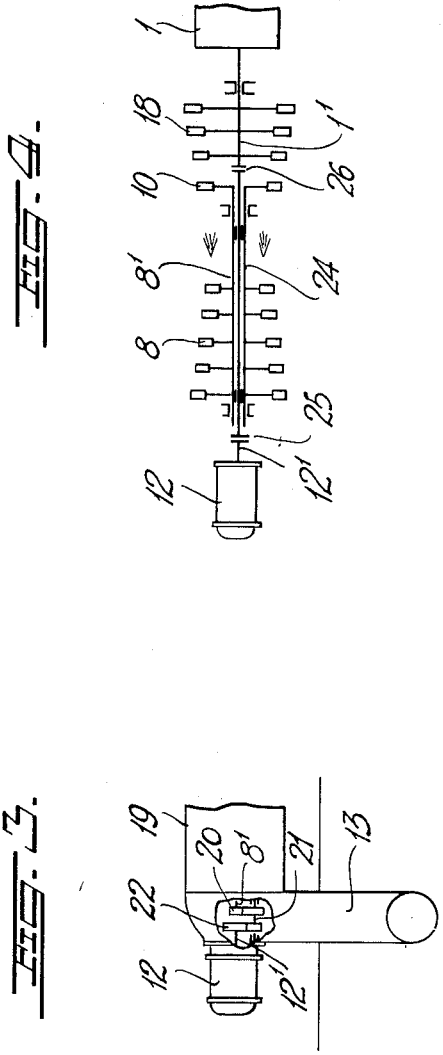
Inventor
Curt Nicolin
Oscar Anton Wiberg
Frans Eric Ossian Ostmar
by Sommers + Young
Attorneys Patented Feb. 12, 1952

2,585,576

UNITED STATES PATENT OFFICE 2,585,576

GAS TURBINE UNIT FOR DRIVING ELECTRIC GENERATORS

Curt Nicolin, Oscar Anton Wiberg, and Frans Eric Ossian Östmar, Finspong, Sweden, assignors to Svenska Turbinfabriks Aktiebolaget Ljungstrom, Finspong, Sweden, a Swedish joint-stock company Application October 24, 1949, Serial No. 123,264
In Sweden November 6, 1948

6 Claims. (Cl. 290—2)

The present invention relates to a gas turbine unit especially for driving electric generators.

A feature of the invention involves that a turbine rotor or rotors is or are carried in a free hung manner by one or both ends of the shaft of said electric generator.

Another feature resides in the provision of driving fluid producers supported by the electric generator, which each comprise as main elements a compressor, a combustion chamber and a turbine for driving the compressor, for supplying driving fluid to said turbine rotor or rotors.

A gas turbine unit embodying this invention is illustrated in the accompanying drawing, in which Fig. 1 is a side elevation of the unit and Fig. 2 is a diagrammatic longitudinal section of the rotary elements of a generator turbine and a driving fluid producer.

Fig. 3 and Fig. 4 illustrate two alternative methods of driving the exciter of the generator.

With reference to the drawing, the numeral 1 indicates the electric generator. Said generator rests with its base portion 2 on a corresponding support 3 comprising an integral portion of a heat exchanger 4 mounted on a floor 5. The shaft of the generator carries by either of its freehung ends a turbine rotor (as indicated at 18 in Fig. 2) of the axial or radial flow type, each of said rotors being enclosed in a turbine casing 6 bolted to the end covers 7 of the generator casing. The turbine rotors are driven by means of gas delivered from driving fluid producers the covers 19 of which are rigidly connected to the electric generator, if desired, via the casings 6 of the turbine rotors, so that the driving fluid producers are substantially supported by the generator.

Each driving fluid producer comprises as main elements a compressor 8, a combustion chamber 9 and a turbine 10 for driving the compressor.

The exciter of the generator may be mounted either on the generator shaft between the rotor of the generator and one turbine rotor, as indicated at 11 in Fig. 1, or at the free end of a driving fluid producer, as indicated at 12 in Fig. 1. In the lastmentioned case two methods of driving the exciter 12 are diagrammatically shown in Figs. 3 and 4, respectively. According to Fig. 3 the exciter 12 is driven by the left hand driving fluid producer of Fig. 1 via a reducing gearing including a pair of gear wheels 20 between the shaft $8^1$ of the driving fluid producer, not shown, and an intermediate shaft 21 and another pair of gear wheels 22 between said intermediate shaft 21 and the shaft $12^1$ of the exciter 12.

According to Fig. 4 one shaft end $1^1$ of the generator 1 is connected to the shaft $12^1$ of the exciter 12 by means of a shaft 24 situated in alignment with shaft end $1^1$ and connected to the exciter shaft and to the shaft end $1^1$ in any suitable way, as indicated at 25 and 26 respectively. Said shaft 24 extends through the shaft $8^1$ of the driving fluid producer, which to this end is tubular.

Air is admitted to the driving fluid producers and, if desired, also to the electric generator for cooling purposes through suction pipes 13. The gases expelled from the generator turbines are passed through pipes 14 to the heat exchanger 4 from which they are discharged through the outlet 15.

The driving fluid producers supported by the generator may be sustained by springs 16 resting on the floor 17 of the machine hall.

A power unit built in accordance with the invention presents a lot of advantages. Since only the electric generator is rigidly supported a free thermic expansion in all directions may take place, whereby undue stresses owing to great differences in temperature are positively avoided in the unit. The mounting is facilitated because of the fact that the vertical adjustment of the various elements is very simple. On account of the comparatively small inertia of the driving fluid producers the unit may be easily accelerated. Since both the driving fluid producers and the generator turbines develop their optimum efficiencies at full load, a unit of the type shown, comprising a driving fluid producer on each side of the generator, may run with high efficiency also at partial loads by uncoupling one driving fluid producer or the other. If the two driving fluid producers are of different sizes, it is thus possible by one and the same unit to obtain three different outputs according as the unit runs with both producers in operation or with only the larger one or only the smaller one in operation. It is thus seen that with a single type or a few types of such driving fluid producers, which may be of standard design, multiple-output units may be built, thereby allowing a considerable reduction of the costs of manufacture.

It is to be noted that modifications may be made as regards details without departing from the principle of the invention.

What we claim is:

1. In a gas turbine unit for driving an electric generator of a type having a rigid casing, free hung shaft ends and an exciter, the combination of a support for the generator, a gas turbine rotor mounted on each free hung shaft end of the generator, a turbine casing for each such rotor supported by the generator casing in free hung relation thereto at opposite ends thereof, driving fluid producers arranged coaxially with relation to the generator and the associated turbine rotors and each adapted to produce and deliver a gaseous driving fluid to a separate one of said turbine rotors, each such producer comprising a casing supported by the casing of the respective turbine rotor in a free hung relation thereto, and inside the producer casing a compressor, a combustion chamber and a turbine for driving the compressor.

2. A gas turbine unit as claimed in claim 1, and in which the support for the electric generator comprises a heat exchanger.

3. A gas turbine unit as claimed in claim 1, and in which the support for the generator comprises a heat exchanger, characterized by the further feature that conduits are provided for passing the exhaust gases expelled from the unit to said heat exchanger.

4. A gas turbine unit as claimed in claim 1, characterized by the further feature that the exciter is mounted on one shaft end of the generator between the generator and the turbine rotor carried by said shaft end.

5. A gas turbine unit as claimed in claim 1, and in which the exciter is connected to one of the driving fluid producers via a reducing gearing.

6. A gas turbine unit as claimed in claim 1, and in which the shaft of a driving fluid producer is tubular, and the exciter is located outside the outer end of said driving fluid producer and positively connected to the respective shaft end of the generator by means of a shaft extending through the tubular shaft of the driving fluid producer.

CURT NICOLIN.
OSCAR ANTON WIBERG.
FRANS ERIC OSSIAN ÖSTMAR.

REFERENCES CITED

The following references are of record in the file of this patent:

UNITED STATES PATENTS

| Number | Name | Date |
|---|---|---|
| 911,825 | Lentz | Feb. 9, 1909 |
| 1,066,209 | Ljungstrom | July 1, 1913 |
| 1,491,423 | Rice | Apr. 22, 1924 |
| 1,741,605 | Baumann | Dec. 31, 1929 |
| 2,263,705 | Seippel | Nov. 2, 1941 |
| 2,336,232 | Doran | Dec. 7, 1943 |
| 2,399,046 | Larrecq | Apr. 23, 1946 |
| 2,428,136 | Barr | Sept. 30, 1947 |
| 2,432,177 | Sedille | Dec. 9, 1947 |
| 2,452,581 | Lehmann | Nov. 2, 1948 |
| 2,459,709 | Lysholm | June 18, 1949 |
| 2,476,179 | Cameron | July 12, 1949 |